United States Patent [19]
Yasunaga et al.

[11] Patent Number: 5,563,912
[45] Date of Patent: Oct. 8, 1996

[54] HIGH EFFICIENCY SPEECH CODING APPARATUS AND TRANSIT SWITCHING SYSTEM EMPLOYING THE SAME

[75] Inventors: Satosi Yasunaga; Katsunori Usuki, both of Tokyo, Japan

[73] Assignee: NEC Corporation, Tokyo, Japan

[21] Appl. No.: 394,955

[22] Filed: Feb. 27, 1995

[51] Int. Cl.$^6$ .................................................. H04B 14/04
[52] U.S. Cl. .......................... 375/242; 375/241; 341/143; 370/84; 370/100.1
[58] Field of Search ..................................... 375/242, 243, 375/244, 254, 240, 241, 246, 253; 370/60, 60.1, 105.3, 105.4, 58.1, 84; 371/31, 57.1, 57.2; 341/55, 143.67; 379/219, 220; 329/311; 381/29, 30

[56] References Cited

U.S. PATENT DOCUMENTS 4,580,013  4/1986  Moisin ................................. 179/81 B
5,381,410  1/1995  Grenot ................................. 370/60.1

FOREIGN PATENT DOCUMENTS 63-185264  7/1988  Japan .

Primary Examiner—Young T. Tse
Assistant Examiner—Bryan E. Webster
Attorney, Agent, or Firm—Sughrue, Mion, Zinn, Macpeak & Seas

[57] ABSTRACT

A high efficiency speech coding apparatus which can eliminate repetitions of high efficiency speech coding and decoding processes of a digital speech signal upon inter-office transit switching without employing a special exchange and a transit switching system which can prevent degradation in quality of speech information and increase in encode and decode processing delay upon transit switching are disclosed. The apparatus repetitively inserts a synchronizing signal into an output speech signal to an exchange and supervises an input speech signal from the exchange to detect a synchronizing signal in order to determine whether the destination of connection of the exchange is a subscriber line or another trunk circuit connected by way of another high efficiency coding apparatus. When a subscriber line is connected, code conversion and inverse code conversion between a high efficiency coded speech signal and a speech signal for the subscriber line are performed using a coding section and a decoding section, respectively. When another trunk circuit is connected, an invalid signal to raise the bit rate of the speech signal to allow transparent transmission through the exchange is added and removed bypassing the coding section and the decoding section.

9 Claims, 3 Drawing Sheets

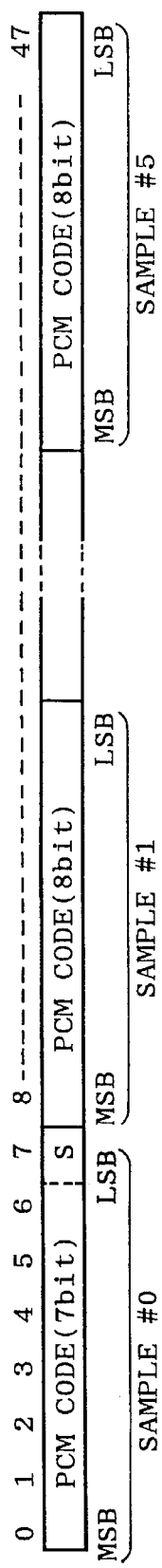
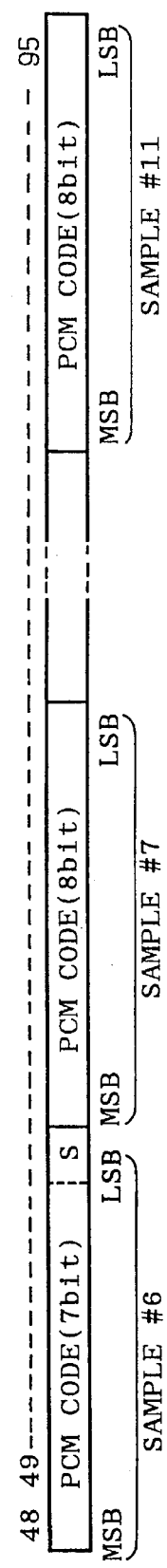
FIG.3
S: SYNCHRONIZING SIGNAL
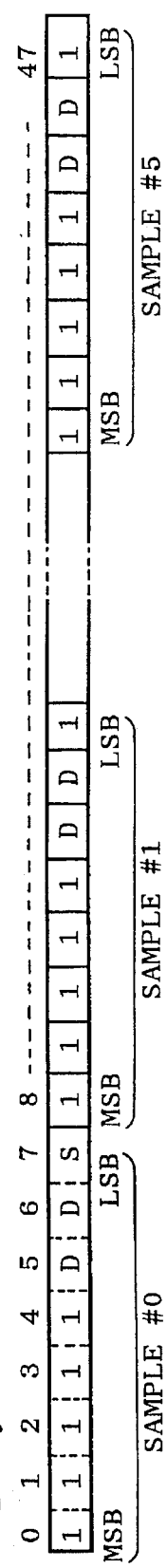
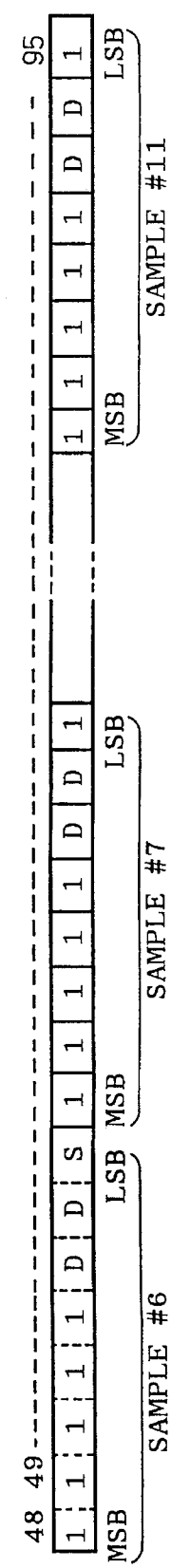
FIG.4
S: SYNCHRONIZING SIGNAL
D: HIGH EFFICIENCY CODED DATA

HIGH EFFICIENCY SPEECH CODING APPARATUS AND TRANSIT SWITCHING SYSTEM EMPLOYING THE SAME

BACKGROUND OF THE INVENTION

1. Field of the Invention

This invention relates to a high efficiency speech coding apparatus, and a routing switching system employing such a high efficiency speech coding apparatus, and, more particularly, to a high efficiency speech coding apparatus which codes and decodes a digital speech signal with high efficiency between a digital exchange and a digital trunk circuit which have different transmission bit rates from each other and a transit switching system which includes such high efficiency speech coding apparatuses between each of a plurality of digital trunk circuits and a digital exchange.

2. Description of the Related Art

In transmission of high efficiency coded speech information which makes use of high speed digital private line or like services, where inter-office transit switching of a digital trunk circuit is performed by a digital exchange which also performs switching with an intra-office subscriber line, the bit rate of a signal transmitted in the trunk circuit (for example, a high efficiency coded speech signal of 16 Kbps) must be matched with the bit rate of a pulse coded modulation (PCM) speech signal of, for example, 64 Kbps.

Therefore, a high efficiency speech coding apparatus, including a coding section for coding a PCM speech signal of 64 Kbps into a high efficiency coded speech signal of 16 Kbps by high efficiency coding, and a decoding section for conversely decoding a high efficiency coded speech signal of 16 Kbps into a PCM speech signal of 64 Kbps, is conventionally provided at a junction between an exchange and a trunk circuit. Thus, upon transmission from the digital exchange to the digital trunk circuit, a signal is passed through the coding section, but on the contrary upon transmission from the digital trunk circuit to the digital exchange, a signal is passed through the decoding section.

The transit switching system, however, has a problem in that, since a speech signal is repetitively processed by high efficiency speech coding and decoding processes each time it is transit switched by an exchange, the speech quality of speech information is degraded and the encode and decode processing delay is increased as much.

A countermeasure to solve the problem is proposed, for example, in Japanese Patent Laid-Open Application No. Showa 63-185264 wherein, using an exchange for exclusive use having a function of controlling a high efficiency speech coding apparatus, when inter-office transit switching is to be performed, a control signal different from a main signal for speech is sent out from the exchange to the high efficiency speech coding apparatus, in which it passes through a rate conversion circuit or the like, bypassing the coding section and the decoding section to prevent repetitions of high efficiency speech coding and decoding.

With the system just described, however, since a control signal different from a main signal must be transmitted, for each transit switching, from an exchange which performs intra-office and inter-office transit switching, to a high efficiency speech coding apparatus, a special exchange which can send out such a control signal is required. Consequently, the system is disadvantageous in that a high cost is required for the exchange and, accordingly, a high cost is required for the entire transit switching system.

SUMMARY OF THE INVENTION

It is an object of the present invention to provide a high efficiency speech coding apparatus which can eliminate repetitions of high efficiency speech coding and decoding processes of a digital speech signal upon inter-office transit switching without employing a special exchange.

It is another object of the present invention to provide a transit switching system which can prevent the degradation in quality of speech information and the increase in encode and decode processing delay upon transit switching.

In order to attain the objects described above, according to an aspect of the present invention, there is provided a high efficiency speech coding apparatus interposed between a digital exchange capable of performing intra-office and inter-office transit switching of a digital speech signal at a first bit rate and a digital trunk circuit which transmits a digital speech signal at a second bit rate lower than the first bit rate, comprising coding means for coding a digital speech signal of a first format having the first bit rate by high efficiency coding into another speech signal of the second format having the second bit rate, decoding means for decoding a digital speech signal of the second format into another digital speech signal of the first format, first rate conversion means for periodically adding an invalid signal of a predetermined bit length to a digital speech signal of the second format inputted thereto from the digital trunk circuit to produce a digital speech signal of a third format having the first bit rate and outputting the digital speech signal of the third format to the digital exchange, synchronizing signal insertion means for inserting a synchronizing signal into a selected one of output signals of the decoding means and the first rate conversion means by replacement so that a predetermined bit pattern array may be obtained and sending out a resulted signal to the digital exchange, synchronizing signal detection means for detecting, when a digital speech signal of the first or third format is inputted thereto from the digital exchange, a synchronizing signal from within the inputted digital speech signal, second rate conversion means for removing, when a digital speech signal of the third format is inputted thereto from the digital exchange, an invalid signal including a synchronizing signal from within the inputted digital speech signal to restore a digital speech signal of the second format and outputting the digital speech signal of the second format to the digital trunk circuit, and selection means operable in response to a result of detection of the synchronizing signal detection means for sending out the output signal of the coding means to the digital trunk circuit and sending out the output signal of the decoding means to the synchronizing signal insertion means when a synchronizing signal is not detected and for sending out the output signal of the second rate conversion means to the digital trunk circuit and sending out the output signal of the first rate conversion means to the synchronizing signal insertion means when a synchronizing signal is detected.

The selection means may include a first selector for sending out the output signal of the coding means to the digital trunk circuit when a synchronizing signal is not detected but sending out the output signal of the second rate conversion means to the digital trunk circuit when a synchronizing signal is detected, and a second selector for sending out the output signal of the decoding means to the synchronizing signal insertion means when a synchronizing signal is not detected but sending out the output signal of the first rate conversion means to the synchronizing signal insertion means when a synchronizing signal is detected.

Preferably, the digital speech signal of the first format is pulse code modulation coded data of a unit length of a predetermined number of bits arrayed in a time sequence, and the synchronizing signal insertion means inserts a synchronizing signal into the array of the pulse code modulation coded data so that the predetermined bit pattern array may be obtained. Preferably, the synchronizing signal insertion means inserts a synchronizing signal into the place of the least significant bit of the pulse code modulation coded data.

In the high efficiency speech coding apparatus, a predetermined synchronizing signal is repetitively inserted into the output speech signal to the exchange while an input speech signal from the exchange is supervised to detect whether or not a synchronizing signal is included in the input speech signal thereby to determine whether the destination of connection of the exchange is a subscriber line of the exchange or another trunk circuit connected by way of another high efficiency coding apparatus. When it is determined that a subscriber line of the exchange is connected, coding and decoding of a high efficiency coded speech signal and a speech signal for the subscriber line are performed using the coding means and the decoding means, respectively. When another trunk circuit is connected, an invalid signal which raises the bit rate of the high efficiency coded speech signal so as to allow transparent transmission of the speech signal through the exchange is added and removed bypassing the coding means and the decoding means. Consequently, the high efficiency speech coding apparatus can eliminate repetitions of high efficiency speech coding and decoding processes of a digital speech signal upon inter-office transit switching without employing a special exchange.

According to another aspect of the present invention, there is provided a transit switching system, comprising the above-described high efficiency speech coding apparatus connected between each of a plurality of digital trunk circuits and a digital exchange. With the transit switching system, since it comprises the high efficiency speech coding apparatus of the construction described above, it can prevent degradation in quality of speech information and increase in encode and decode processing delay upon transit switching.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a diagrammatic view showing an example of a data format of a PCM speech signal in which a synchronizing signal is inserted; and FIG. 4 is a similar view but showing an example of a data format of a speech signal obtained by high efficiency coding to 16 Kbps to which an invalid signal is added and in which a synchronizing signal is inserted.

DETAILED DESCRIPTION OF THE PREFERRED EMBODIMENT

Figure 1:
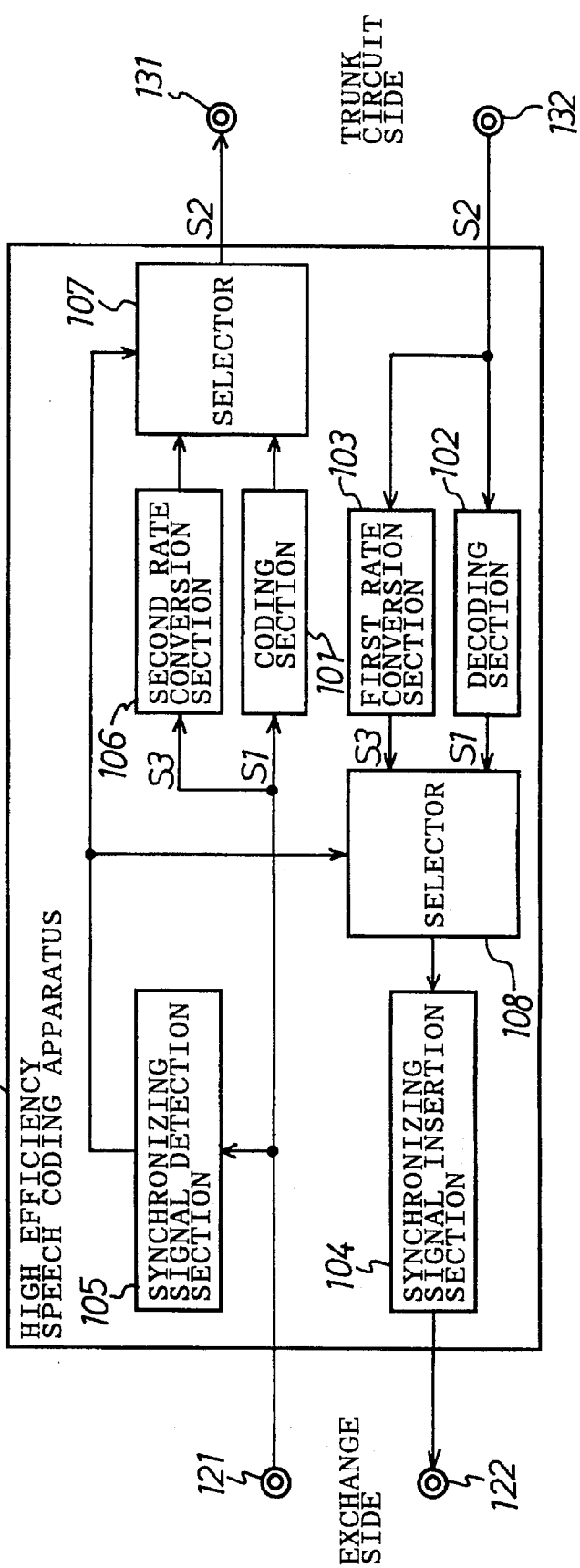
FIG. 1 is a block diagram of a high efficiency speech coding apparatus to which the present invention is applied.

Referring first to FIG. 1, there is shown a high efficiency speech coding apparatus to which the present invention is applied. The high efficiency speech coding apparatus is generally denoted at 10 and has an input terminal 121 and an output terminal 122 on the exchange side by way of which a digital speech signal is inputted from and outputted to a digital exchange to and from the high efficiency speech coding apparatus 10, respectively, and an output terminal 131 and an input terminal 132 on the trunk circuit side by way of which a digital speech signal is outputted to and inputted from a digital trunk circuit from and to the high efficiency speech coding apparatus 10, respectively. The high efficiency speech coding apparatus 10 includes a coding section 101 for coding a digital speech signal inputted thereto by way of the input terminal 121 on the exchange side by high efficiency coding, a decoding section 102 for decoding a high efficiency coded speech signal inputted thereto by way of the input terminal 132 on the trunk circuit side, a first rate conversion section 103 for periodically adding an invalid signal of a predetermined bit length, having no significance as communication information, to a high efficiency coded speech signal inputted thereto by way of the input terminal 132 on the trunk circuit side to convert the bit rate of the high efficiency coded speech signal, a second rate conversion section 106 for converting the bit rate of a digital speech signal inputted thereto by way of the input terminal 121 on the exchange side, a first selector 107 for selectively sending out one of the output signals of the second rate conversion section 106 and the coding section 101 to the output terminal 131 on the trunk circuit side, a second selector 108 for selectively sending out one of the output signals from the first rate conversion section 103 and the decoding section 102 to the output terminal 122 on the exchange side, a synchronizing signal insertion section 104 for inserting a synchronizing signal into an output signal selected by the second selector 108, and a synchronizing signal detection section 105 for detecting a synchronizing signal from a digital speech signal inputted by way of the input terminal 121 on the exchange side.

More particularly, the coding section 101 codes a PCM speech signal S1 of 64 Kbps from the exchange into a high efficiency coded speech signal S2 of 16 Kbps by adaptive differential pulse code modulation (ADPCM) or some other suitable coding. The decoding section 102 decodes a high efficiency coded speech signal S2 of 16 Kbps from the trunk line into a PCM speech signal S1 of 64 Kbps.

The first rate conversion section 103 adds an invalid signal of 6 bits (for example, a signal wherein all of the 6 bits have a logical value "1" as seen in FIG. 4) to a high efficiency coded speech signal S2 of 16 Kbps from the trunk circuit for each high efficiency coded data D of 2 bits to produce a pseudo PCM speech signal S3 of 64 Kbps and outputs the PCM speech signal S3. The synchronizing signal insertion section 104 inserts (bit steal) a synchronizing signal S, for example, into the original least significant bit (LSB) at the least significant bit position in 8 bits for each six samples of one of the output signals of the decoding section 102 and the first rate conversion section 103 selected by the second selector 108 as seen in FIGS. 3 and 4. Accordingly, in this instance, such synchronizing signal S is inserted after every 6×8=48 bits as seen from FIG. 4. Where the sample distance at which the synchronizing signal S is to be inserted is otherwise set, for example, to 40 samples, the synchronizing signal is inserted after each 40×8=320 bits.

The synchronizing signal detection section 105 detects a synchronizing signal S from within a PCM speech signal S1 of 64 Kbps or a pseudo PCM speech signal S3 of 64 Kbps received from the exchange. The second rate conversion section 106 removes an invalid signal including a synchronizing signal from within a pseudo PCM speech signal S3 received from the exchange. The first selector 107 selects, in response to a detection output from the synchronizing signal detection section 105, the output signal of the coding section 101 when a synchronizing signal has not been detected, but selects the output signal of the second rate conversion section 106 when a synchronizing signal has been detected, and sends out the selected output signal to the trunk circuit. The second selector 108 selects, similarly in response to the detection output of the synchronizing signal detection section 105, the output signal of the decoding section 102 when a synchronizing signal has not been detected, but selects the output signal of the first rate conversion section 103 when a synchronizing signal has been detected, and sends out the selected output signal to the synchronizing signal insertion section 104.

Figure 2:
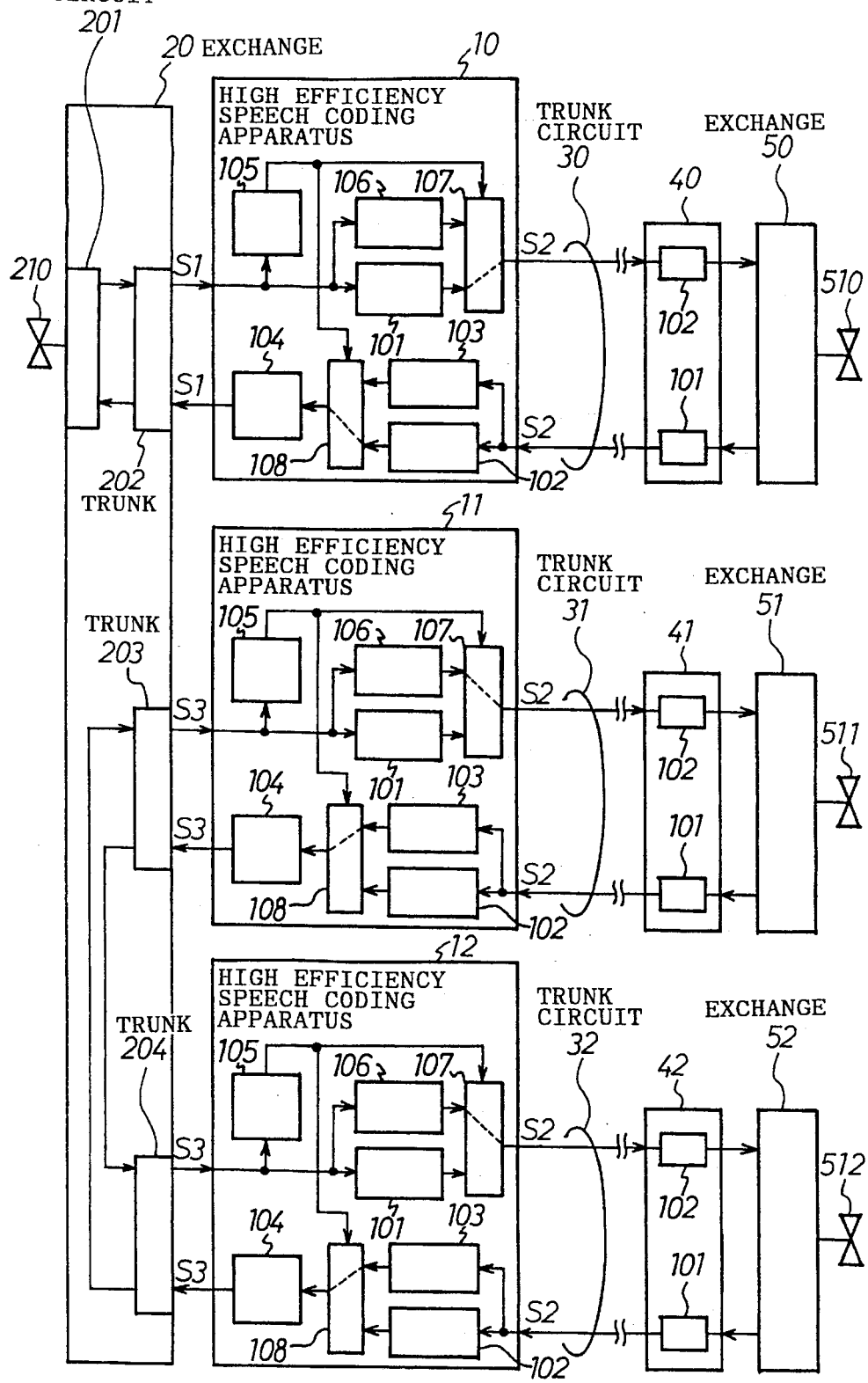
FIG. 2 is a block diagram of a transit switching system to which the present invention is applied.

FIG. 2 shows a repeating switching system to which the present invention is applied. It is to be noted that, in FIG. 2, only those elements which relate to a speech signal in service are shown. Referring to FIG. 2, a plurality of pairs of trunk circuits 30, 31 and 32 are connected to a single exchange 20 by way of high efficiency speech coding apparatuses 10, 11 and 12, respectively. The high efficiency speech coding apparatuses 10, 11 and 12 have the same construction as that of the high efficiency speech coding apparatus 10 described above with reference to FIG. 1. The exchange 20 includes a subscriber's circuit 201, and trunks 202, 203 and 204 connecting to the high efficiency speech coding apparatus 10, 11 and 12, respectively, and performs switching processing of a digital speech signal of 64 Kbps. Each of the trunk circuits 30, 31 and 32 transmits a high efficiency coded digital speech signal of 16 Kbps therethrough, and such digital speech signal can be multiplexed with a signal of another high efficiency speech coding apparatus (not shown) by a multiplexing apparatus (also not shown). The other ends of the trunk circuits 30, 31 and 32 are connected to telephone terminals 510, 511 and 512 by way of high efficiency speech coding apparatuses 40, 41 and 42, each of which includes a coding section 101 and a decoding section 102, and exchanges 50, 51 and 52 for switching a PCM speech signal of 64 Kbps, respectively. It is to be noted that, if the high efficiency speech coding apparatuses 40, 41 and 42 connected to the other ends of the trunk circuits 30, 31 and 32 are constructed in the same construction as that of the high efficiency speech coding apparatus 10 (described hereinabove with reference to FIG. 1), then they can be connected to further exchanges by way of the high efficiency speech coding apparatus 40, 41 and 42.

In operation, the exchange 20 receives connection information, such as a dialing signal, by a signal reception apparatus thereof (not shown), and in order to connect a telephone terminal 210 of a subscriber line of the exchange 20 and a trunk circuit 30 to each other, the exchange 20 connects the subscriber's circuit 201 and the corresponding trunk 202 to each other. In the high efficiency speech coding apparatus 10, since a PCM speech signal S1 of 64 Kbps from the subscriber's circuit 201 is inputted, the synchronizing signal detection section 105 does not detect a synchronizing signal, and consequently, the first selector 107 selects the coding section 101 while the second selector 108 selects the decoding section 102. Meanwhile, the synchronizing signal insertion section 104 inserts a synchronizing signal S into a PCM speech signal S1 of 64 Kbps to be outputted to the exchange 20 so that the predetermined bit pattern array may be obtained as described hereinabove. The bit pattern array of the synchronizing signal is a repeat pattern of "0" and "1" or a sequence pattern such as a maximum length linear sequence (M sequence) pattern.

It is to be noted that a protection circuit for preventing an error in detection of a synchronizing signal is provided for the synchronizing signal detection section 105. The backward protection range (a time or a frame number until a synchronizing bit is detected and it is determined that synchronization has been established after a condition in which synchronization is not established is lost) of the protection circuit is set sufficiently long. However, the forward protection range (a time or a frame number until a synchronizing bit is not detected any more and it is determined that establishment of synchronization has been given up after a condition in which synchronization is established is lost) of the protection circuit may be set short since little circuit error occurs within the period.

The PCM speech signal S1 outputted from the high efficiency speech coding apparatus 10 after insertion of tile synchronizing signal is transmitted by way of the subscriber's circuit 201 and outputted as speech from the telephone terminal 210. In this instance, however, the thus inserted synchronizing signal S has little influence on the quality of the output speech since the insertion frequency of the synchronizing signal S is low and the insertion of the synchronizing signal S only involves replacement of the least significant bit of PCM codes. In this manner, communication of speech information between the telephone terminal 210 and the telephone terminal 510 is performed using the coding sections 101 and the decoding sections 102 of the high efficiency speech coding apparatuses 10 and 40.

On the other hand, in order for the exchange 20 to transit switch a signal between the trunk circuits 31 and the trunk circuits 32, it connects the trunk 203 and the trunk 204 to each other. The synchronizing signal insertion section 104 of each of the high efficiency speech coding apparatus 11 and 12 inserts a synchronizing signal S into a PCM speech signal of 64 Kbps from the respective decoding section 102 and outputs a resulted signal. The signals from the high efficiency speech coding apparatus 11 and 12 transparently pass through the exchange 20 and are inputted to the synchronizing signal detection sections 105 of the other high efficiency speech coding apparatus 12 and 11, respectively. Each of the synchronizing signal detection sections 105 changes over, when it detects a synchronizing signal from the input signal thereto, the selectors 107 and 108 to the second rate conversion section 106 side and the first rate conversion section 103 side, respectively. The first rate conversion section 103 in each of the high efficiency speech coding apparatus 12 and 11 adds bit data of an invalid signal to a high efficiency coded speech signal S2 of 16 Kbps received from the trunk circuits 31 or 32 to produce a pseudo PCM speech signal S3 of 64 Kbps, and the synchronizing signal insertion section 104 replaces some bits of the invalid signal with bits of the synchronizing signal S. FIG. 4 shows an example of a data format of the speech signal in this instance. In the example shown in FIG. 4, to 2 bits of high efficiency coded data D of each sample, "1" which is usually used as an invalid signal is added by 6 bits including 5 bits added to the high order bit side and one bit added to the low order bit side. Further, a synchronizing signal S is inserted for each 6 samples by a bit steal of the low order bit side invalid signal portion. Also, the PCM speech signals S3 of 64 Kbps outputted from the high efficiency speech coding apparatuses 11 and 12, transparently pass through the exchange 20 and are inputted to the other high efficiency speech coding apparatus 12 and 11. The second rate conversion section 106 in each of the high efficiency speech coding apparatus 12 and 11 removes the bit data of the invalid signal including the synchronizing signal S from the PCM speech signal S3 of 64 Kbps received from the exchange 20 to restore the high efficiency coded speech signal S2 of 16 Kbps. When the exchange 20 functions as a transit switching exchange in this manner, since the coding section 101 and the decoding section 102 of the high efficiency speech coding apparatus 11 and 12 are bypassed, communication of speech information between the telephone terminals 511 and 512 involves high efficiency speech coding and decoding each only once, and consequently, otherwise possible degradation of the quality of speech in service is eliminated.

After the service comes to an end, the exchange 20 disconnects the transit switching path between the trunk 203 and the trunk 204. Consequently, an insignificant PCM speech signal is inputted to each of the high efficiency speech coding apparatus 11 and 12, and therefore, the synchronizing signal detection section 105 in each of the high efficiency speech coding apparatus 11 and 12 does not detect a synchronizing signal any more. As a result, the selectors 107 and 108 of the high efficiency speech coding apparatus 11 and 12 restore their initial conditions.

Having now fully described the invention, it will be apparent to one of ordinary skill in the art that many changes and modifications can be made thereto without departing from the spirit and scope of the invention as set forth herein.

What is claimed is:

1. A speech coding apparatus interposed between (1) a digital exchange capable of performing intra-office and inter-office transit switching of a digital speech signal at a first bit rate, and (2) a digital trunk circuit which transmits a high efficiency coded digital speech signal at a second bit rate lower than said first bit rate, said apparatus comprising:

coding means for coding said digital speech signal of a first format having said first bit rate into said high efficiency coded digital speech signal of a second format having said second bit rate;

decoding means for decoding said high efficiency coded digital speech signal of said second format into said digital speech signal of said first format;

first rate conversion means for periodically adding an invalid signal of a predetermined bit length to the digital speech signal of said second format inputted thereto from said digital trunk circuit to produce said digital speech signal of a third format having said first bit rate and outputting said digital speech signal of said third format to said digital exchange;

synchronizing signal insertion means for inserting a synchronizing signal into a selected one of output signals of said decoding means and said first rate conversion means by periodic replacement of a bit of said selected one of said output signals so that a predetermined bit pattern array may be obtained and sending out a resulted signal to said digital exchange;

synchronizing signal detection means for detecting, when said digital speech signal of said first or said third format is inputted thereto from said digital exchange, a synchronizing signal from within said inputted digital speech signal;

second rate conversion means for removing, when said digital speech signal of said third format is inputted thereto from said digital exchange, an invalid signal including said synchronizing signal from within said inputted digital speech signal to restore the digital speech signal of said second format and outputting said digital speech signal of said second format to said digital trunk circuit; and selection means operable in response to said detection by said synchronizing signal detection means, for:
(1) sending out said output signal of said coding means to said digital trunk circuit and said output signal of said decoding means to said synchronizing signal insertion means, when said synchronizing signal is not detected, and
(2) sending out said output signal of said second rate conversion means to said digital trunk circuit and sending out said output signal of said first rate conversion means to said synchronizing signal insertion means, when said synchronizing signal is detected.

2. A speech coding apparatus as claimed in claim 1, wherein said selection means includes a first selector for sending out the output signal of said coding means to said digital trunk circuit when said synchronizing signal is not detected but sending out the output signal of said second rate conversion means to said digital trunk circuit when said synchronizing signal is detected, and a second selector for sending out the output signal of said decoding means to said synchronizing signal insertion means when said synchronizing signal is not detected but sending out the output signal of said first rate conversion means to said synchronizing signal insertion means when said synchronizing signal is detected.

3. A speech coding apparatus as claimed in claim 1, wherein the digital speech signal of the first format is pulse code modulation coded data of a unit length of a predetermined number of bits arrayed in a time sequence, and said synchronizing signal insertion means inserts said synchronizing signal into the array of the pulse code modulation coded data so that the predetermined bit pattern array may be obtained.

4. A speech coding apparatus as claimed in claim 3, wherein said synchronizing signal insertion means inserts said synchronizing signal into the place of the least significant bit of the pulse code modulation coded data.

5. A transit switching system, comprising:

a digital exchange capable of performing intra-office and inter-office transit switching of a digital speech signal of a first format having a first bit rate;

digital trunk circuits, each of which transmits a high efficiency coded digital speech signal of a second format coded at a second bit rate, said second bit rate being lower than said first bit rate; and speech coding apparatuses, each of which is connected between a respective one of said digital trunk circuits and said digital exchange, each of said speech coding apparatuses comprising:

coding means for coding said digital speech signal of said first format into said high efficiency coded digital speech signal of said second format;

decoding means for decoding said high efficiency coded digital speech signal of said second format into said digital speech signal of said first format;

first rate conversion means for (1) periodically adding an invalid signal of a predetermined bit length to the digital speech signal of said second format inputted thereto from said respective one of said digital trunk circuits to produce said digital speech signal of a third format having said first bit rate, and (2) outputting said digital speech signal of said third format to said digital exchange;

synchronizing signal insertion means for (1) inserting a synchronizing signal into a selected one of output signals of said decoding means and said first rate conversion means by periodic replacement of a bit of said selected one of said output signals so that a predetermined bit pattern array may be obtained, and (2) sending out a resulted signal to said digital exchange;

synchronizing signal detection means for detecting, when said digital speech signal of said first or said third format is inputted thereto from said digital exchange, said synchronizing signal in said inputted digital speech signal;

second rate conversion means for (1) removing, when said digital speech signal of said third format is inputted thereto from said digital exchange, said invalid signal and said synchronizing signal from said inputted digital speech signal to restore said digital speech signal of said second format, and (2) outputting said digital speech signal of said second format to said respective one of said digital trunk circuits; and selection means, operable in response to said detection by said synchronizing signal detection means, for:
(1) sending out said output signal of said coding means to said respective one of said digital trunk circuits, and said output signal of said decoding means to said synchronizing signal insertion means, when said synchronizing signal is not detected, and
(2) sending out said output signal of said second rate conversion means to said respective one of said digital trunk circuits, and said output signal of said first rate conversion means to said synchronizing signal insertion means, when said synchronizing signal is detected.

6. A speech coding apparatus communicating with a digital exchange at a first bit rate and with a trunk circuit at a second bit rate, said apparatus comprising:

a coder for coding an exchange-side input signal having a speech signal format to produce a first trunk-side output signal;

a decoder for decoding a trunk-side input signal to produce a first exchange-side output signal having said speech signal format;

a first rate convertor for inserting an invalid signal of a predetermined bit length into said trunk-side input signal to produce a second exchange-side output signal having a pseudo speech signal format;

a second rate convertor for converting said exchange-side input signal having said pseudo speech signal format to produce a second trunk-side output signal by removing a synchronizing signal and said invalid signal;

a selector providing as a selected exchange-side output signal said first exchange-side output signal when a detection signal is not present, and said second exchange-side output signal when said detection signal is present, said selector providing to said trunk circuit said first trunk-side output signal when said detection signal is not present, and said second trunk-side output signal when said detection signal is present;

a synchronizing signal inserter for inserting said synchronizing signal into said selected exchange-side output signal to provide a resulting exchange-side output signal to said digital exchange; and a synchronizing signal detector for producing said detection signal when said exchange-side input signal contains said synchronizing signal.

7. The apparatus as set forth in claim 6, wherein said selector comprises a first selector section for determining said selected exchange-side output signal for said synchronizing signal inserter, and a second selector section for determining said signal provided to said trunk circuit.

8. The apparatus as set forth in claim 6, wherein:
said exchange-side input signal having said speech signal format is pulse code modulation coded data having units with a predetermined unit bit length; and said synchronizing signal is inserted into said pulse code modulation coded data to obtain a predefined bit pattern array.

9. The apparatus as set forth in claim 8, wherein said synchronizing signal is inserted into the least significant bit of said units of said pulse code modulation coded data.

* * * * *